(12) United States Patent
Lin et al.

(10) Patent No.: US 11,578,261 B2
(45) Date of Patent: *Feb. 14, 2023

(54) METHOD OF HYDRAULIC FRACTURING UTILIZING A HYDRAULIC FRACTURING FLUID WITH A SINGLE PHASE LIQUID PROPPANT

(71) Applicant: CNPC USA CORPORATION, Houston, TX (US)

(72) Inventors: Lijun Lin, Katy, TX (US); Jiangshui Huang, Sugar Land, TX (US); Litao Bai, Houston, TX (US); Stephanie Yu, Houston, TX (US); Fuchen Liu, Panjin (CN); Congbin Yin, Chengdu (CN); Wei Gong, Chengdu (CN)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,955

(22) Filed: Jul. 20, 2020

(65) Prior Publication Data

US 2020/0369952 A1    Nov. 26, 2020

Related U.S. Application Data

(63) Continuation of application No. 16/171,156, filed on Oct. 25, 2018, now Pat. No. 10,752,829.

(51) Int. Cl.
*E21B 43/267* (2006.01)
*C09K 8/80* (2006.01)
*C09K 8/66* (2006.01)
*C09K 8/68* (2006.01)

(52) U.S. Cl.
CPC ............... *C09K 8/80* (2013.01); *C09K 8/665* (2013.01); *C09K 8/68* (2013.01); *E21B 43/267* (2013.01)

(58) Field of Classification Search
CPC ........... C09K 8/80; C09K 8/665; E21B 43/26; E21B 43/16; E21B 43/267
See application file for complete search history.

(56) References Cited

U.S. PATENT DOCUMENTS

| | | |
|---|---|---|
| 5,199,491 A | 4/1993 | Kutta et al. |
| 6,059,034 A | 5/2000 | Rickards et al. |
| 6,439,309 B1 | 8/2002 | Matherly et al. |
| 7,044,220 B2 | 5/2006 | Nguyen et al. |
| 7,322,411 B2 | 1/2008 | Brannon et al. |
| 7,581,590 B2 | 9/2009 | Lesko et al. |

(Continued)

OTHER PUBLICATIONS

Chang, F. F., Berger, P. D., & Lee, C. H. "In-Situ Formation of Proppant and Highly Permeable Blocks for Hydraulic Fracturing." presented SPE Hydraulic Fracturing Technology Conference, The Woodlands, Texas; Feb. 3-5, 2015; Society of Petroleum Engineers (SPE-173328-MS) doi:10.2118/173328-MS.

*Primary Examiner* — Silvana C Runyan
(74) *Attorney, Agent, or Firm* — Hogan Lovells US LLP

(57) ABSTRACT

The disclosed hydraulic fracturing fluid can include a liquid solvent, one or more surfactants, a proppant-forming compound, and one or more curing agents. When injected into a wellbore, the hydraulic fracturing fluid reacts to form proppant pillars in-situ under downhole conditions. The proppant pillars are capable of maintaining conductive fractures.

20 Claims, 8 Drawing Sheets

(56) References Cited

U.S. PATENT DOCUMENTS

| | | |
|---|---|---|
| 8,168,570 B2 | 5/2012 | Barron et al. |
| 9,834,721 B2 | 12/2017 | Chang et al. |
| 2005/0274517 A1* | 12/2005 | Blauch ............... C09K 8/68 |
| | | 166/280.2 |
| 2006/0157243 A1* | 7/2006 | Nguyen ............. C09K 8/805 |
| | | 166/280.2 |
| 2008/0135245 A1* | 6/2008 | Smith ........... C04B 35/62886 |
| | | 166/280.2 |
| 2008/0139412 A1* | 6/2008 | Fuller ................. C09K 8/72 |
| | | 507/219 |
| 2012/0325472 A1 | 12/2012 | Litvinets et al. |
| 2016/0053160 A1* | 2/2016 | Nguyen ........... C09K 8/5751 |
| | | 166/308.5 |
| 2016/0137910 A1 | 5/2016 | Chang et al. |
| 2016/0281454 A1* | 9/2016 | Zhu ................... E21B 33/12 |
| 2016/0289543 A1 | 10/2016 | Chang et al. |
| 2017/0292062 A1 | 10/2017 | Wylde et al. |
| 2017/0362495 A1* | 12/2017 | Sangaru ............ C09K 8/575 |
| 2018/0298271 A1* | 10/2018 | Auzerais ............. C09K 8/80 |

\* cited by examiner

1(A)
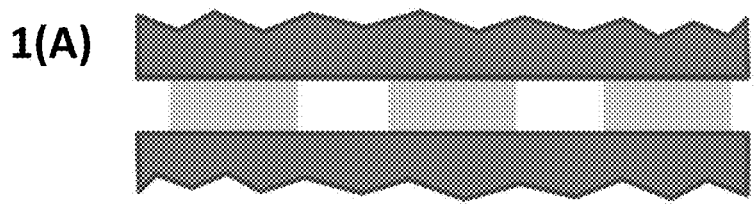
1(B)
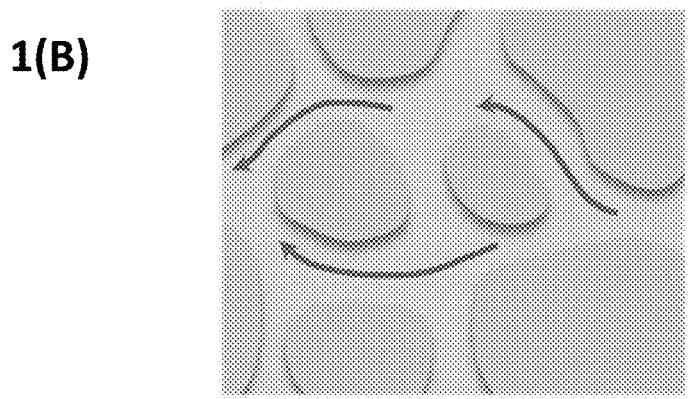
1(C)
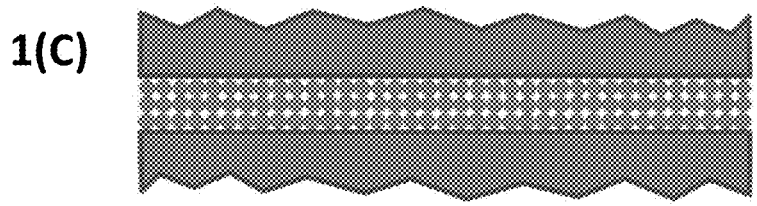
Fig. 1(A), 1(B), and 1(C)

METHOD OF HYDRAULIC FRACTURING UTILIZING A HYDRAULIC FRACTURING FLUID WITH A SINGLE PHASE LIQUID PROPPANT

CROSS-REFERENCE TO RELATED APPLICATIONS

This application is a continuation of U.S. patent application Ser. No. 16/171,156, filed Oct. 25, 2018, issued as U.S. Pat. No. 10,752,829 on Aug. 25, 2020; incorporated herein by reference in its entirety.

FIELD

The disclosure relates generally to subterranean formation treatments. The disclosure relates specifically to proppants in a hydraulic fracturing fluid for oil and gas recovery improvement.

BACKGROUND

Hydraulic fracturing has been an important technique to enhance production of hydrocarbon from oil and gas bearing formation. In a typical hydraulic fracturing treatment, hydraulic fracturing fluid containing a solid proppant is injected into the formation at a pressure high enough to cause or enlarge a fracture in the reservoir. When the hydraulic fracturing fluid is removed, packed proppant can keep the fracture open, allowing fluids to flow from the formation through the proppant to the production wellbore. The proppant is of extreme importance as it provides a long-term conductivity of the fracture.

The main function of proppants is to provide and maintain conductive fractures where proppants should meet closure stress requirement and show resistance to diagenesis under downhole conditions. Different proppants have been developed to meet the requirement of enhancing production of hydrocarbon with various materials, sizes and shapes. Many materials have been used as proppants including silica sand, glass and ceramic. The hydraulic fracturing fluid carrying the proppant in the fracture generally contains water, polymer, crosslinker, fluid loss additives, surfactants, flow back additives, surfactants, clay stabilizers, proppant, and gel breaker. The polymer is used to provide viscosity and keep the proppants suspended until they have reached their desired location in the fracture. The breakers are used to reduce the polymer viscosity, allowing the particles to settle and the liquid portion of the fracturing fluid to be returned to the surface when the external pressure is removed. The proppants remain in the fracture and form permeability channels to increase the oil or gas production.

The success of the fracturing treatment may depend on the permeability of the proppant. U.S. Pat. No. 7,581,590 to Timothy Lesko et al. discloses a method of heterogeneous proppant placement in a fracture. The method is based on the concept that proppant can be placed discontinuously within the fracture. This technique uses a pumping scheme where proppant is added in short pulses, alternating with pulses without proppant. Specialized fibers render the integrity of the proppant pulses by binding the proppant particles together, thus keeping the proppant in the form of individual clusters in the fracture. In this way, hydrocarbons can flow through the channels separating the proppant clusters rather than flowing through the proppant pack itself as in conventional fractures. From this principle, the conductivity of the channel fracturing technique would well exceed that of a continuous proppant pack, resulting in improved hydrocarbon productions.

The conventional proppants have certain disadvantages such as formation and fracture permeability damage due to the viscous gel residue, risk of early screen-out and reduced effective propped area due to proppant excessive leakoff or settling, and abrasion to the pumping equipment and tubular. To eliminate the effect of some disadvantages, and have more application potential, U.S. Pat. No. 9,834,721 to Fakuen Frank Chang et al. discloses a chemical composition and method for converting injected fracturing fluid into a permeable proppant pack in-situ.

It would be advantageous to develop a fracturing fluid to improve conductivity of the proppant.

SUMMARY

In an embodiment the disclosure is directed to compositions and methods for fracturing treatment. The disclosure is specifically directed to fracture fluids and methods for fracturing a reservoir and in-situ proppant generation using polymetric materials. The disclosed liquid system reacts to form proppant pillars in-situ under downhole conditions. Individual beads can also be generated. Hydrocarbon can flow to the wellbore for production through the channels between the proppant pillars. The proppant pillars can support the fractures and can provide higher hydraulic conductivity. This can be an alternative to a pulsed proppant fracturing method with formation of proppant pillars. In an embodiment, the beads can form downhole instead of forming at the surface and being pumped downhole.

An embodiment of the disclosure is a hydraulic fracturing fluid comprising a proppant for use in a downhole environment comprising a liquid solvent; at least one surfactant; a proppant-forming compound; and at least one curing agent; wherein the proppant forms pillars form a two-dimensional structure capable of maintaining conductive fractures in the downhole environment.

In an embodiment, the liquid solvent is selected from the group consisting of water, seawater, brine containing monovalent, divalent, and multivalent salts, an alcohol such as ethanol, propanol, and butanol, and combinations thereof.

In an embodiment, the surfactant is selected from the group consisting of anionic surfactants, cationic surfactants, nonionic surfactants, amphoteric surfactants and combinations thereof.

In an embodiment, the proppant-forming compound is selected from the group consisting of aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ethernovalac resins, and combinations thereof.

In an embodiment, the curing agent is selected from the group consisting of isophorone diamine, boron tri-fluoride derivatives, imidazolines, mercaptans, hydrazides, polyamides, functional resins, mono ethanol amine, benzyl dimethylamine, lewis acids, tertiary amines, cycloaliphatic amines, amidoamines, aliphatic amines, aromatic amines, isophorone, imidazoles, sulfide, amides and their derivatives.

In an embodiment, the hydraulic fracturing fluid further comprises a pH control agent. In an embodiment, the pH control agent is selected from the group consisting of mineral acids such as hydrochloric acid, sulfuric acid, nitric acid, and fluoroboric acid, sulfonic acids such as ethanesulfonic acid and methanesulfonic acid, carboxylic acids such as acetic acid, sodium hydroxide, potassium hydroxide, calcium hydroxide, and combinations thereof.

In an embodiment, the hydraulic fracturing fluid further comprises a viscosity modifier. In an embodiment, the viscosity modifiers is selected from the group consisting of nanoparticles such as calcium carbonate nanoparticles and silicate nanoparticles, and water-soluble polymers such as polyacrylamide and polyvinyl alcohol.

In an embodiment, the hydraulic fracturing fluid further comprises a strength enhancing additive. In an embodiment, the strength enhancing additive is selected from the group consisting of silicon particles, graphene particles, carbon black, and ceramic particles, and combination thereof.

An embodiment of the disclosure wherein the hydraulic fracturing fluid comprises 3 wt % Tween™ 20, 7 wt % Hostafrac SF14413, 30 wt % sea water, 30 wt % Max CLR A resin, and 30 wt % Max CLR B curing agent. In an embodiment, the proppant forms individual solid beads.

An embodiment of the disclosure wherein the hydraulic fracturing fluid comprises An embodiment of the disclosure wherein the hydraulic fracturing fluid comprises 31 wt % sea water, 31 wt % Max CLR A resin, 31 wt % Max CLR B curing agent and 7 wt % Hostafrac SF 14504. In an embodiment, the proppant forms individual solid beads.

An embodiment of the disclosure wherein the hydraulic fracturing fluid comprises 31 wt % sea water, 31 wt % Max CLR A resin, 31 wt % Max CLR B curing agent and 7 wt % Hyamine 1622. In an embodiment, the proppant forms a block.

An embodiment of the disclosure wherein the hydraulic fracturing fluid comprises 23 wt % Poly(Bisphenol A-CO-Epichlorohydrin), Glycidyl End-Capped, 50 wt % 10% Sodium chloride solution, 5 wt % Tomamine 12 surfactant, 5 wt % 50% Sodium hydroxide, 15 wt % Mackazoline T, and 2 wt % Isophorone diamine. In an embodiment, the proppant forms agglomerated pillars.

An embodiment of the disclosure wherein the hydraulic fracturing fluid comprises 1.7 wt % Tween 20, 0.5 wt % Hostafrac SF14413, 37.8 wt % seawater, 30 wt % Max CLR A, and 30 wt % Max CLR B. In an embodiment, the proppant forms big pieces and individual beads.

An embodiment of the disclosure wherein the hydraulic fracturing fluid comprises 3.5 wt % Tween 20, 1.5 wt % Hostafrac SF14413, 65 wt % seawater, 17 wt % Max CLR A, and 13 wt % Max CLR B. In an embodiment, the proppant forms pillars.

An embodiment of the disclosure is a method of hydraulic fracturing comprising pumping the hydraulic fracturing fluid downhole.

An embodiment of the disclosure is a method of fracturing a reservoir with a hydraulic fracturing fluid that generates fractures in the reservoir, the method comprising the steps of: mixing a liquid solvent, one or more surfactants, a proppant-forming compound, and one or more curing agents to form a liquid composition; pumping the liquid composition into an injection well in the reservoir at an external pressure to generate fractures in the reservoir; allowing the liquid composition to react to form in-situ proppants, wherein the in-situ proppants are operable to keep the fractures open after the external pressure is released.

In an embodiment, the liquid solvent is selected from the group consisting of water, seawater, brine containing monovalent, divalent, and multivalent salts, an alcohol such as ethanol, propanol, and butanol, and combinations thereof.

In an embodiment, the surfactant is selected from the group consisting of anionic surfactants, cationic surfactants, nonionic surfactants, amphoteric surfactants and combinations thereof.

In an embodiment, the proppant-forming compound is selected from the group consisting of aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ethernovalac resins, and combinations thereof.

In some embodiments, the method further comprises the step of adding a pH control agent to the liquid composition. In an embodiment, the pH control agent is selected from the group consisting of mineral acids such as hydrochloric acid, sulfuric acid, nitric acid, and fluoroboric acid, sulfonic acids such as ethanesulfonic acid and methanesulfonic acid, carboxylic acids such as acetic acid, sodium hydroxide, potassium hydroxide, calcium hydroxide, and combinations thereof.

In an embodiment, the method further comprises the step of adding a viscosity modifier to the liquid composition. In an embodiment, the viscosity modifiers is selected from the group consisting of nanoparticles such as calcium carbonate nanoparticles and silicate nanoparticles, and water soluble polymers such as polyacrylamide and polyvinyl alcohol.

In an embodiment, the method further comprises the step of adding a strength enhancing additive to the liquid composition. In an embodiment, the strength enhancing additive is selected from the group consisting of silicon particles, graphene particles, carbon black, and ceramic particles, and combination thereof.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIGS. 1(A), 1(B), and 1(C). FIGS. 1(A) and 1(B) depict simplified schematic illustrating proppant pillars to maintain the width of the fracture. FIG. 1(A) depicts a side view of the proppant pillars. FIG. 1(B) depicts a top view of the propant pillars. The hydrocarbon flows through the channels to the wellbore for production. FIG. 1(C) depicts a conventional proppant pack which depends on its porosity to provide hydraulic conductivity;

Tomanine 12, 5(C) Tomadol 902, 5(D) Mega Surf 101, 5(E) ASP 133, 5(F) 6191X, 5(G) Hostafrac SF 14413, 5(H) Hostafrac SF 14334.

Figure 6:
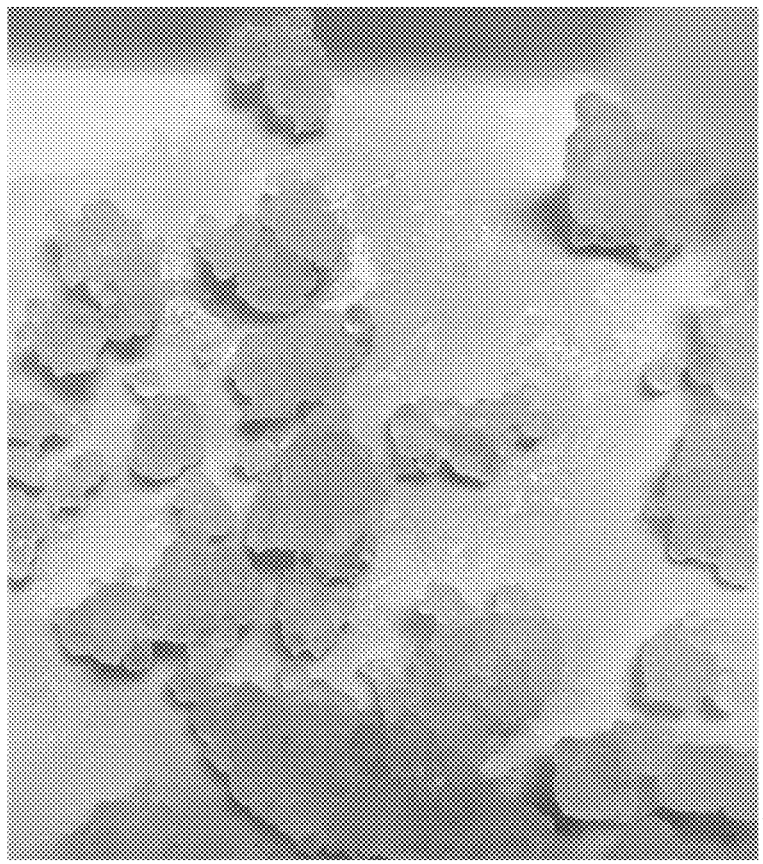
Figure 7:
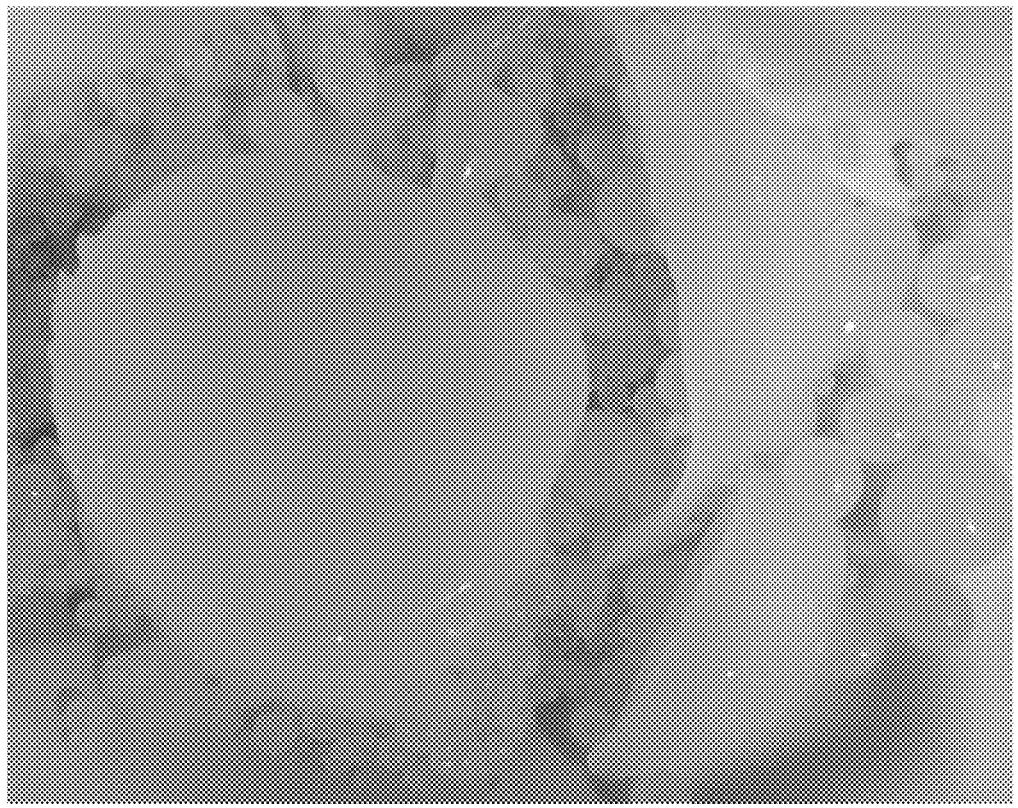

FIG. 6 depicts products of agglomerated beads or islands;

FIG. 7 depicts products of some big pieces with some individual beads; and

Figure 8:
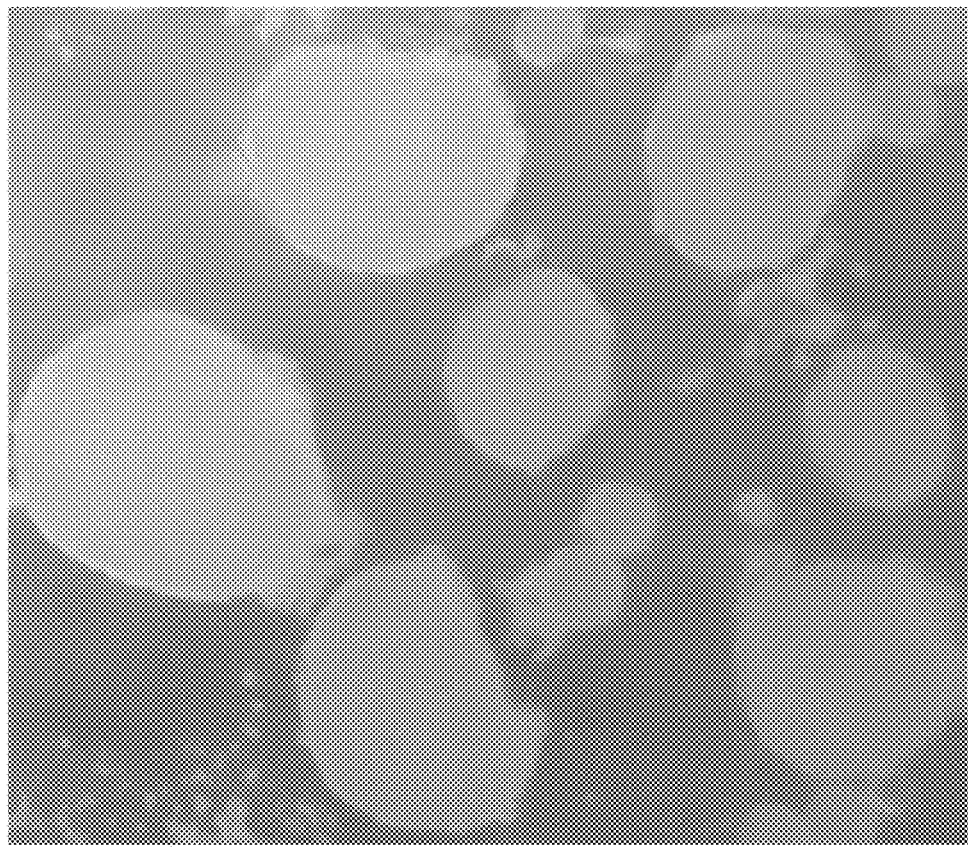

FIG. 8 depicts structure of proppant pillars (white) and channels created in a slot to mimic the hydraulic fractures.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

The present disclosure describes a hydraulic fracturing fluid. The fluid will lead to the formation of proppant in bead or pillar geometry under downhole conditions. By selecting various surfactants, beads and/or big pieces can be created. By pumping the liquid into a reservoir under sufficient external pressure, the liquid can fracture the formation and then form in-situ proppant in the fracture without the need of pumping conventional proppant with viscous fracturing fluid. Thus, it can reduce or eliminate the issue of proppant settling in the wellbore and the damage associated with conventional fracturing fluids. Also, the proppant in pillar geometry has higher mechanical strength than proppant clusters made of the same materials. Furthermore, the proppant in pillar structure forms a structure with channels of high conductivity for hydrocarbon to flow to the wellbore for production.

The size range of the proppant is very important for hydraulic fracture treatment. Proppant size is generally between 8 and 140 mesh (105 μm to 2.38 mm). Typically, larger particle sizes provide higher fracture conductivity. The traditional fracture treatment will start with smaller particle size proppant and tailor with larger particle size proppant to maximize the near wellbore conductivity. The in-situ formed proppant particles can be significantly larger than conventional proppant particles. Referring to FIG. 1(A) and FIG. 1(B), proppant particles generated by the hydraulic fracturing fluid of the present disclosure form a pillar geometry structure. The proppant pillar geometry structures comprises proppant pillars with channels between them for formation fluids to flow. In an embodiment, the proppant formed is large in size. In an embodiment, the width of the hydraulic fracture is mainly maintained by separated proppant pillars, as opposed to proppant clusters. Larger particle size and the pillar geometry structure can help to improve fracture conductivity.

In an embodiment, the hydraulic fracturing fluid includes a liquid solvent, one or more surfactants, a proppant-forming compound, and one or more curing agents. In some embodiments, the liquid solvent can be aqueous solvents and non-aqueous solvents. Certain aqueous solvents include, but are not limited to, water, seawater, brine containing monovalent, divalent, and multivalent salts. Certain non-aqueous solvents include, but are not limited to, alcohol such as ethanol, propanol, and butanol, and combinations thereof.

Examples of proppant-forming compounds include, but are not limited to, aliphatic epoxides, anhydrides, glycidyl amine epoxide, cycloaliphatic epoxides, epoxy functional resins, polyurethane resins, phenol-formaldehyde resin, bisphenol A diglycidyl ether, poly glycidyl ethers, acrylic resin, glycidyl ethers, bis-phenol F diglycidyl ethernovalac resins, and combinations thereof. In a preferred embodiment, the proppant-forming compound includes Max CLR™ A resin. Max CLR™ is a trademark of Polymer Composites Corporation. Max CLR™ A is a modified bisphenol A epoxy resin, 90-100% by weight phenol, 4-(1-methylethylidene) Bis, Polymer with (Chloromethane) Oxerane, 1-5% by weight epoxidize diluent reactive, 0-10% by weight epoxidize cresylglyciderether modified, and 0.1-0.5% by weight non-silicone additive.

Surfactants can be anionic surfactants, cationic surfactants, nonionic surfactants, amphoteric surfactants and combinations thereof. In an embodiment, the surfactant includes Hostafrac SF14504 and Hostafrac SF14413. Hostafrac™ is a trademark of Clamant International Ltd. Hostafrac SF14413 is a product of Clamant Corporation and is 10-20% by weight proprietary ingredient 6615, 10-20% by weight ethoxylated isotridecanol, 1-10% proprietary ingredient 6715, 1-5% solvent naphtha, 0.1-1% by weight naphthalene.

Certain examples of curing agent include, but are not limited to isophorone diamine, boron tri-fluoride derivatives, imidazolines, mercaptans, hydrazides, polyamides, functional resins, mono ethanol amine, benzyl dimethylamine, Lewis acids, tertiary amines, cycloaliphatic amines, amidoamines, aliphatic amines, aromatic amines, isophorone, imidazoles, sulfide, amides and their derivatives. In an embodiment, the curing agent includes Max CLR™ B. Max CLR™ is a trademark of Polymer Composites Corporation. Max CLR™ B is an amine modified curing agent. It contains about between 5-15% by weight benzyl alcohol, 15-35% by weight isophoromediamine adduct, and 50-60% by weight aliphatic amine adduct.

In some embodiments, pH control agents and viscosity modifiers may be added into the liquid solvent. Certain examples of pH control agents include but are not limited to mineral acids such as hydrochloric acid, sulfuric acid, nitric acid, and fluoroboric acid, sulfonic acids such as ethanesulfonic acid and methanesulfonic acid, carboxylic acids such as acetic acid, sodium hydroxide, potassium hydroxide, calcium hydroxide, and combinations thereof. Examples of viscosity modifiers include but are not limited to nanoparticles such as calcium carbonate nanoparticles and silicate nanoparticles, and water-soluble polymers such as polyacrylamide and polyvinyl alcohol.

In some embodiments, the hydraulic fracturing fluid further includes strength enhancing additives to improve the strength of the proppant. In an embodiment, the strength enhancing additives can be selected from silicon particles, graphene particles, carbon black, ceramic particles, and combinations thereof.

EXAMPLES

Several fluid candidates forming in-situ proppants were evaluated as follows:

Example 1

Table 1 lists the components of liquid system 1. Liquid system 1 includes 3 wt % Tween™ 20 (surfactant), 7 wt % Hostafrac SF14413 (another surfactant), 30 wt % sea water, 30 wt % Max CLR A resin, and 30 wt % Max CLR B curing agent. Tween™ is a registered trademark of Croda International plc, and contains alkoxylate. Hostafrac. SF14413 is a product of Clariant Corporation. It includes 10-20% by weight proprietary ingredient 6615, 10-20% by weight ethoxylated isotridecanol, 1-10% proprietary ingredient 6715, 1-5% solvent naphtha, and 0.1-1% by weight naphthalene. Max CLR™ is a trademark of Polymer Composites Corporation. Max CLR™ A is a modified bisphenol A epoxy resin, 90-100% by weight phenol, 4-(1-methylethylidene) Bis, Polymer with (Chloromethane) Oxerane, 1-5% by weight epoxidize diluent reactive, 0-10% by weight epoxidize cresylglyciderether modified, and 0.1-0.5% by weight non-silicone additive. Max CLR™ B is an amine modified curing agent. It contains about between 5-15% by weight benzyl alcohol, 15-35% by weight isophoromediamine adduct, and 50-60% by weight aliphatic amine adduct.

TABLE 1

| Liquid components | Wt. % |
| --- | --- |
| Tween ™ 20 | 3 |
| Hostafrac SF14413 | 7 |
| Seawater | 30 |
| Max CLR ™ A | 30 |
| Max CLR ™ B | 30 |

Figure 2:
FIG. 2 depicts liquid system 1 after mixing at RT.
Figure 3:
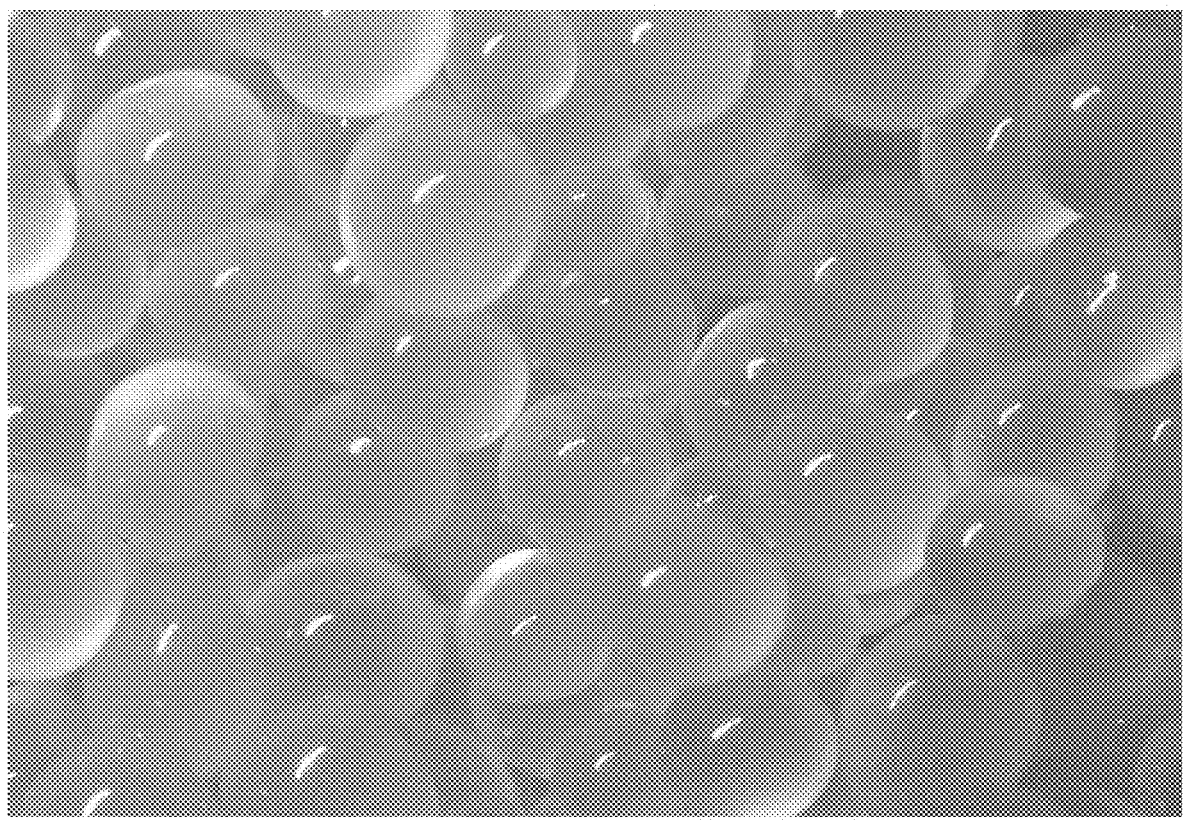
FIG. 3 depicts the proppant product of liquid system 1 after heating at 60° C. for 1 hour.

All components are in liquid form and mixed at room temperature (RT). Room temperature is the range of air temperatures that most people prefer for indoor settings. The range is between 15° C. and 25° C. Liquid system 1 was mixed for 15 minutes (FIG. 2) and then the mixture was heated undisturbed at 60 degrees Celsius in a water bath for 1 hour. Individual solid beads were generated (FIG. 3). FIG. 3 shows the solid beads after being air dried at RT. The effective liquid to solid conversion rate (ELSCR) can be over 95%. The ELSCR is defined as the weight of the solid particles generated divided by the weight of Max CLR™ A with Max CLR™ B. The beads were tested for crush resistance and acid solubility according to ISO 13503-2. The fine generated was less than 3% with a closure stress up to 10,000 psi. The acid dissolution was less than 3%.

Two surfactants Tween™ 20 and Hostafrac SF14413 were used together to create the individual solid beads. The advantage of using two surfactants rather than one is that the Hydrophile-Lipophile Balance (HLB) value can be well adjusted by changing the ratio of the surfactants to control the coalescence rate of emulsion to generate desired products.

Example 2

Figure 4:
FIG. 4 depicts the proppant product of liquid system 2 after heating at 60° C. for 1 hour.

The components of liquid system 2 are listed in Table 2. Liquid system 2 includes 31 wt % sea water, 31 wt % Max CLR A resin, 31 wt % Max CLR B curing agent and 7 wt % Hostafrac SF 14504. Hostafrac™ is a trademark of Clariant International Ltd. Hostafrac SF14504 is a surfactant product of Clariant Corporation. It includes less than 5% ethoxylated alcohol, less than 10% polyoxylene monobutyl ether, and less than 5% polylene glycol. All components are in liquid form and mixed in a plastic cup at room temperature. The mixture was heated undisturbed at 60 degrees Celsius in a water bath for 1 hour to generate individual solid beads (FIG. 4).

TABLE 2

| Liquid chemicals | Wt. % |
| --- | --- |
| Hostafrac SF 14504 surfactant | 7% |
| Sea water | 31% |
| Max CLR A resin | 31% |
| Max CLR B curing agent | 31% |

Example 3

The components of liquid system 3 are listed in Table 3. Liquid system 3 includes 31 wt % sea water, 31 wt % Max CLR A resin, 31 wt % Max CLR B curing agent and 7 wt % Hyamine 1622. Hyamine is a registered trademark of Lonza Group, Ltd. Hyamine 1622 is a surfactant comprising cationic detergent benzethonium chloride. All components are in liquid form and mixed in a plastic cup at room temperature.

TABLE 3

| Liquid chemicals | Wt. % |
| --- | --- |
| Hyamine 1622 | 7% |
| Sea water | 31% |
| Max CLR A resin | 31% |
| Max CLR B curing agent | 31% |

Figures 5A, 5B, 5C, 5D, 5E, 5F, 5G, 5H:
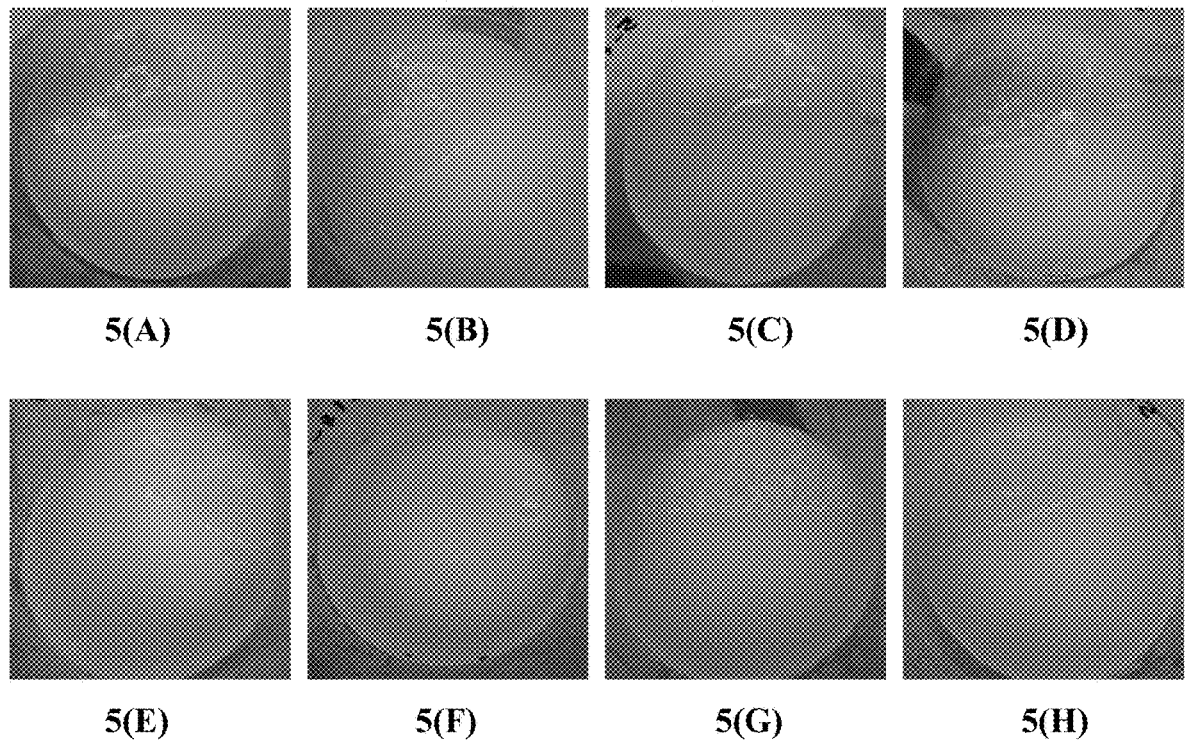
FIG. 5(A)-5(H) depict reaction mixtures containing various surfactants after 1 hour at 60° C.; the reaction mixtures contain surfactants as follows: 5(A) Hyamine 1622, 5(B)

The mixture was heated undisturbed at 60 degrees Celsius in a water bath for 1 hour. After that, a whole block was formed instead of individual solid beads (FIG. 5(A)). When Hyamine 1622 was replaced with other surfactants listed in Table 4 and the mixtures were heated undisturbed at 60 degrees Celsius in a water bath for 1 hour, these products were formed into whole blocks (FIG. 5(B)-5(H)). These in-situ formed blocks can serve the purpose of supporting the fracture like proppant pillars (FIGS. 1(A) and 1(B)). FIG. 5(B) shows reaction product containing TOMANINE 12, FIG. 5(C) shows reaction product containing Tomadol 902, FIG. 5(D) shows reaction product containing Mega Surf 101, FIG. 5(E) shows reaction product containing ASP 133, FIG. 5(F) shows reaction product containing 6191X, FIG. 5(G) shows reaction product containing Hostafrac SF 14413, and FIG. 5(H) shows reaction product containing Hostafrac SF 14334. MegaSurf 101 is a surfactant made by Shrieve Chemical Company; TOMADOL 902 and TOMANINE 12 are surfactants made by Air Products; ASP133 and CorsiTech 6191X are surfactants made by Nalco; Bio-Terge AS-40 is a surfactant made by Stepan; Hostafrac SF 14334 and Hostafrac SF 14413 are surfactants made by Clariant.

TABLE 4

| Surfactant Vendor | Surfactant Name |
| --- | --- |
| Air Products | TOMANINE 12 |
| Air Products | TOMADOL 902 |
| Shrieve | MegaSurf 101 |
| Nalco | ASP133 |

TABLE 4-continued

| Surfactant Vendor | Surfactant Name |
|---|---|
| Nalco | CorsiTech 6191X |
| Clariant | Hostafrac SF 14413 |
| Clariant | Hostafrac SF 14334 |

Example 4

Table 5 lists the components of liquid system 4. Liquid system 4 includes 23 wt % Poly(Bisphenol A-CO-Epichlorohydrin), Glycidyl End-Capped, 50 wt % 10% Sodium chloride solution, 5 wt % Tomamine 12 surfactant, 5 wt % 50% Sodium hydroxide, 15 wt % Mackazoline T, and 2 wt % Isophorone diamine

TABLE 5

| Liquid chemicals | Wt. % |
|---|---|
| Poly(Bisphenol A-CO-Epichlorohydrin), Glycidyl End-Capped | 23% |
| 10% Sodium chloride solution | 50% |
| Tomamine 12 surfactant | 5% |
| 50% Sodium hydroxide | 5% |
| Mackazoline T | 15% |
| Isophorone diamine | 2% |

Poly (Bisphenol A-CO-Epichlorohydrin), Glycidyl End-Capped (Average Mn~355) is a resin with molecular formula $(C_{18}H_{22}O_3)n.C_{22}H_{26}O_4$; Tomamine 12 surfactant contains 65% water and 35% "alkyl imino dipropionic acid, monosodium salt"; Mackazoline T contains 95-99% "Tall oil hydroxyethyl imidazoline" and 1-5% aminoethylethanolamine.

All components are in liquid form and mixed in a plastic cup at room temperature. The mixture was heated undisturbed at 60 degrees Celsius in a water bath for 1 hour. FIG. 6 shows the reaction product of liquid system 4. The product will form agglomerated beads or islands. These in-situ formed bead islands can serve the purpose of supporting the fracture like proppant pillars.

Example 5

Table 6 lists the components of liquid system 5. Liquid system 5 includes 1.7 wt % Tween 20, 0.5 wt % Hostafrac SF14413, 37.8 wt % seawater, 30 wt % Max CLR A, and 30 wt % Max CLR B.

TABLE 6

| Liquid components | Wt. % |
|---|---|
| Tween ™ 20 | 1.7 |
| Hostafrac SF14413 | 0.5 |
| Seawater | 37.8 |
| Max CLR ™ A | 30 |
| Max CLR ™ B | 30 |

Liquid system 5 was mixed for 15 minutes in a plastic cup and allowed to stand undisturbed in water bath at 60° C. for 1 hour to react. It formed a proppant in big pieces with some individual beads formed as shown in FIG. 7. The in-situ formed big pieces can serve the purpose of supporting the fracture like proppant pillars.

Example 6

Table 7 lists the components of liquid system 6. Liquid system 6 includes 3.5 wt % Tween 20, 1.5 wt % Hostafrac SF14413, 65 wt % seawater, 17 wt % Max CLR A, and 13 wt % Max CLR B.

TABLE 7

| Liquid components | Wt. % |
|---|---|
| Tween ™ 20 | 3.5 |
| Hostafrac SF14413 | 1.5 |
| Seawater | 65 |
| Max CLR ™ A | 17 |
| Max CLR ™ B | 13 |

Liquid system 6 was mixed for 5 minutes in a plastic cup, pumped into a slot made of one clear tempered glass and one satin-etched tempered glass parallel to each other with a gap width of 1/16 inch to mimic a hydraulic fracture, and then allowed to stand undisturbed in an oven at 60° C. for 3 hour to react to form proppant pillars and channels structures as shown in FIG. 8. The proppant pillars are to maintain the width of the hydraulic fractures created, and the channels are for hydrocarbon to flow through the wellbore for production as indicated in FIG. 1(B).

Wherein Tween™ is a registered trademark of Croda International plc, containing Alkoxylate. Hostafrac SF14413 is a product of Clariant Corporation. 10-20% by weight proprietary ingredient 6615, 10-20% by weight ethoxylated isotridecanol, 1-10% proprietary ingredient 6715, 1-5% solvent naphtha, and 0.1-1% by weight naphthalene.

Max CLR™ is a trademark of Polymer Composites Corporation. Max CLR™ A is a modified bisphenol A epoxy resin, 90-100% by weight phenol, 4-(1-methylethylidene) Bis, Polymer with (Chloromethane) Oxerane, 1-5% by weight epoxidize diluent reactive, 0-10% by weight epoxidize cresylgliciderether modified, and 0.1-0.5% by weight non-silicone additive. Max CLR™ B is an amine modified curing agent. It contains about between 5-15% by weight benzyl alcohol, 15-35% by weight isophoromediamine adduct, and 50-60% by weight aliphatic amine adduct.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of hydraulic fracturing comprising
    formulating a hydraulic fracturing fluid comprising:
        at least one liquid solvent,
        at least one surfactant,
        at least one liquid phase proppant-forming compound,
        at least one curing agent;
    injecting the hydraulic fracturing fluid into a wellbore;

wherein a product of agglomerated individual solid beads is generated from a liquid system in-situ under down hole conditions; and wherein the product of agglomerated individual solid beads forms pillars in a two-dimensional structure capable of maintaining conductive fractures in a downhole environment, wherein in the hydraulic fracturing fluid further comprises:

31 wt % sea water, 31 wt % resin comprising: 90-100% Phenol, 4-(1-methylethylidene) Bis, polymer with (chloromethane) oxerane, 1-20% epoxide Diluent, 0-10% Modified Epoxy Novalac, 0.1-0.5% Non-Silicone Additive, 31 wt % curing agent comprising: 5-15% Benzyl Alcohol, 15-35% isophoronediamine adduct, 50-60% Aliphatic amine adduct, 7 wt % cationic detergent comprising 99% benzethonium chloride and 1% water.

2. The method of claim 1, wherein the at least one liquid solvent further comprises water, brine containing monovalent, divalent, and multivalent salts, ethanol, propanol, butanol, or combinations thereof.

3. The method of claim 1, wherein the at least one surfactant further comprises anionic surfactants, cationic surfactants, nonionic surfactants, amphoteric surfactants and combinations thereof.

4. The method of claim 1, wherein the at least one liquid phase proppant-forming compound further comprises aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ethernovalac resins, and combinations thereof.

5. The method of claim 1, wherein the at least one curing agent further comprises isophorone diamine, boron tri-fluoride derivatives, imidazolines, mercaptans, hydrazides, polyamides, functional resins, mono ethanol amine, benzyl dimethylamine, Lewis acids, tertiary amines, cycloaliphatic amines, amidoamines, aliphatic amines, aromatic amines, isophorone, imidazoles, sulfide, amides and their derivatives.

6. The method of claim 1, further comprising a pH control agent selected from the group comprising mineral acids, fluoroboric acid, sulfonic acids, carboxylic acids and combinations thereof.

7. The method of claim 1, further comprising a viscosity modifier selected from the group comprising of nanoparticles and water-soluble polymers.

8. The method of claim 1, further comprising a strength enhancing additive.

9. The method of claim 8, wherein the strength enhancing additive is selected from the group comprising silicon particles, graphene particles, carbon black, ceramic particles, and combination thereof.

10. The method of claim 1, wherein the at least one liquid phase proppant-forming compound forms individual solid beads.

11. The method of claim 1, A method of hydraulic fracturing comprising formulating a hydraulic fracturing fluid comprising:
at least one liquid solvent,
at least one surfactant,
at least one liquid phase proppant-forming compound,
at least one curing agent injecting the hydraulic fracturing fluid into a wellbore;

wherein a product of agglomerated individual solid beads is generated from a liquid system in-situ under down hole conditions; and wherein the product of agglomerated individual solid beads forms pillars in a two-dimensional structure capable of maintaining conductive fractures in a downhole environment, wherein the hydraulic fracturing fluid further comprises:

23 wt % Poly(Bisphenol A-CO-Epichlorohydrin), Glycidyl End-Capped, 50 wt % 10% Sodium chloride solution, 5 wt % surfactant comprising 35% alkyl imino dipropionic acid, monosodium salt in 65% water, 5 wt % 50% Sodium hydroxide, 15 wt % fatty amine comprising 95-99% tall oil hydroxyethyl imidazoline and 1-5% aminoethylethanolamine, and 2 wt % Isophorone diamine.

12. The method of claim 11, wherein the at least one liquid solvent further comprises water, seawater, brine containing monovalent, divalent, and multivalent salts, ethanol, propanol, butanol, or combinations thereof.

13. The method of claim 11, wherein the at least one surfactant further comprises anionic surfactants, cationic surfactants, nonionic surfactants, amphoteric surfactants and combinations thereof.

14. The method of claim 11, wherein the at least one liquid phase proppant- forming compound further comprises aliphatic epoxides, anhydrides, glycidyl amine epoxide, cycloaliphatic epoxides, epoxy functional resins, polyurethane resins, phenol- formaldehyde resin, bis-phenol A diglycidyl ether, poly glycidyl ethers, acrylic resin, glycidyl ethers, bis-phenol F diglycidyl ethernovalac resins, and combinations thereof.

15. The method of claim 11, wherein the at least one curing agent further comprises isophorone diamine, boron tri-fluoride derivatives, imidazolines, mercaptans, hydrazides, polyamides, functional resins, mono ethanol amine, benzyl dimethylamine, Lewis acids, tertiary amines, cycloaliphatic amines, amidoamines, aliphatic amines, aromatic amines, isophorone, imidazoles, sulfide, amides and their derivatives.

16. The method of claim 11, further comprising a pH control agent selected from the group comprising mineral acids, fluoroboric acid, sulfonic acids, carboxylic acids and combinations thereof.

17. The method of claim 11, further comprising a viscosity modifier selected from the group comprising nanoparticles and water-soluble polymers.

18. The method of claim 11, further comprising a strength enhancing additive.

19. The method of claim 11, wherein the liquid phase proppant-forming compound forms individual solid beads.

20. The method of claim 19, wherein the strength enhancing additive is selected from the group comprising silicon particles, graphene particles, carbon black, ceramic particles, and combination thereof.

* * * * *